United States Patent
Kuo et al.

(10) Patent No.: US 8,814,551 B2
(45) Date of Patent: Aug. 26, 2014

(54) POSITIONING CONTROL EJECTION MECHANISM AND TURNTABLE DEVICE USING SAME

(75) Inventors: Shien-Cheng Kuo, Tu-Cheng (TW); Mi-Chien Chen, Tu-Cheng (TW); Wei Zeng, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 591 days.

(21) Appl. No.: 13/149,882

(22) Filed: May 31, 2011

(65) Prior Publication Data

US 2012/0107437 A1 May 3, 2012

(30) Foreign Application Priority Data

Oct. 28, 2010 (CN) .......................... 2010 1 0523398

(51) Int. Cl.
*B28B 17/00* (2006.01)

(52) U.S. Cl.
USPC .................. 425/139; 425/171; 425/436 RM; 425/165

(58) Field of Classification Search
CPC .. B29C 33/44; B29C 33/442; B29C 45/4005; B29C 45/401; B29C 45/42
USPC .......... 425/171, 139, 444, 436 RM, 556, 577, 425/165, 554, 351

See application file for complete search history.

(56) References Cited

U.S. PATENT DOCUMENTS 3,418,684 A * 12/1968 Collins .......................... 425/156

FOREIGN PATENT DOCUMENTS

| CH | 630840 A | * | 7/1982 |
| JP | 2008105301 | * | 5/2008 |

* cited by examiner

*Primary Examiner* — Amjad Abraham
*Assistant Examiner* — Ninh Le
(74) *Attorney, Agent, or Firm* — Novak Druce Connolly Bove + Quigg LLP

(57) ABSTRACT

A positioning control ejection mechanism includes an ejection motor, an ejection rod, a position confirm switch, and an upper limit switch. The ejection rod is slidably driven with the ejection motor. The position confirm switch is assembled to the ejection motor and is positioned along an ejection direction of the ejection rod. The position confirm switch is configured for sensing when the ejection rod is aligned with a pre-ejection product. The upper limit switch is assembled to the ejection motor and is positioned along an ejection direction of the ejection rod away from the ejection motor end, preventing the ejection rod from being over ejected.

16 Claims, 6 Drawing Sheets

POSITIONING CONTROL EJECTION MECHANISM AND TURNTABLE DEVICE USING SAME

BACKGROUND

1. Technical Field

This disclosure relates to positioning control ejection mechanisms, and particularly, to a positioning control ejection mechanism and a turntable device using the same.

2. Description of Related Art

A commonly used positioning control ejection mechanism generally includes a positioning control mechanism and an ejection mechanism. As the positioning control ejection mechanism is applied to a vertical turntable device, the positioning control mechanism and the ejection mechanism are oppositely assembled under a turntable of the vertical turntable device, and occupy a relatively large space within the vertical turntable device. In addition, the existing positioning control ejection mechanism has low work efficiency.

Therefore, there is room for improvement in the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the positioning control ejection mechanism and turntable device using the same. Moreover, in the drawings like reference numerals designate corresponding parts throughout the several views. Wherever possible, the same reference numerals are used throughout the drawings to refer to the same or like elements of an embodiment.

DETAILED DESCRIPTION

Figure 1:
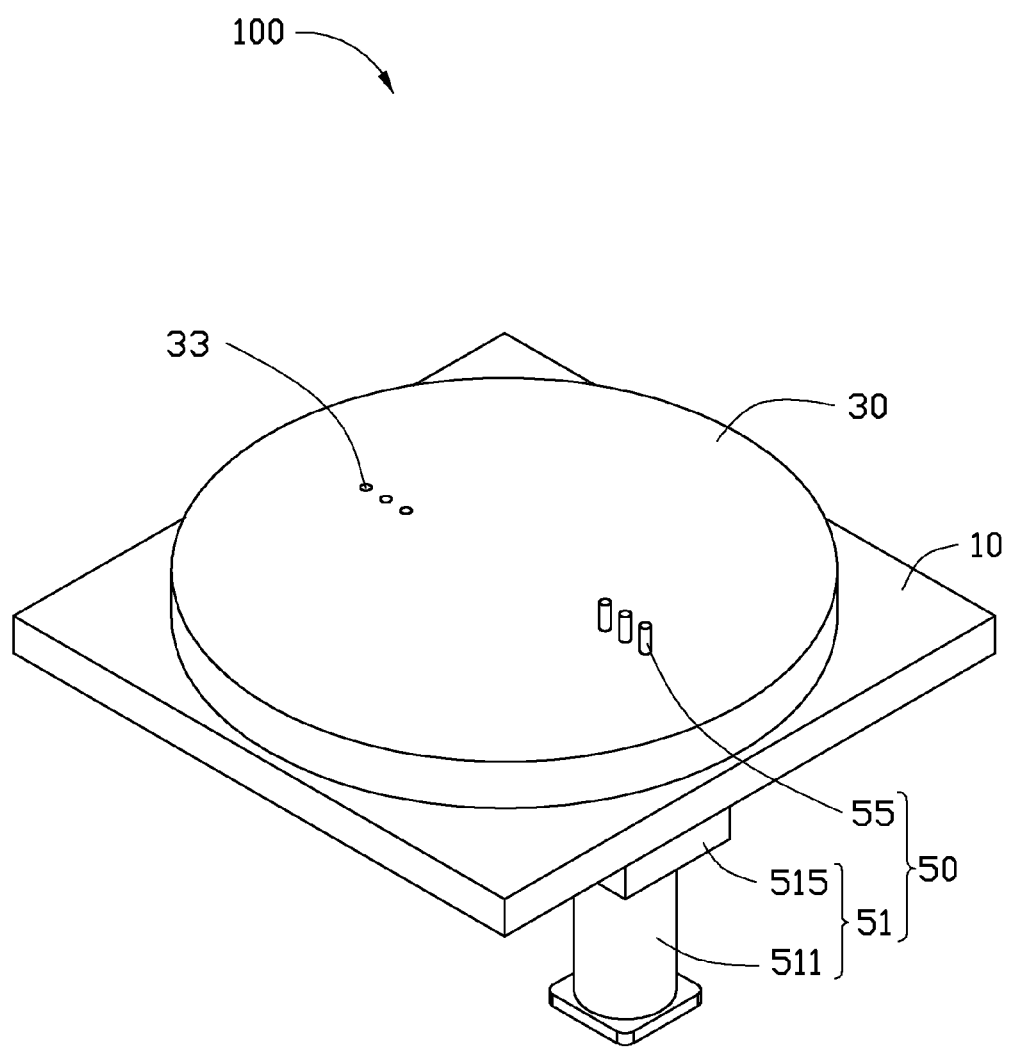
FIG. 1 is an assembled, isometric view of an embodiment of a turntable device.

Referring to FIG. 1, an embodiment of a turntable device 100 is shown. The turntable device 100 includes a worktable 10, a turntable 30 and a positioning control ejection mechanism 50. The worktable 10 is a substantially rectangular board, and defines at least one guiding hole 13 (shown in FIG. 3) therethrough. In one embodiment, three guiding holes 13 are separately defined through the worktable 10 and are positioned along a line.

The turntable 30 is rotatably mounted upon the worktable 10 and is driven by a driver (not shown) to rotate relative to the worktable 10. The turntable 30 defines at least one ejection hole 33 positioned along a radial direction of the turntable 30, corresponding to the at least one guiding hole 13 of the worktable 10. In one embodiment, there are two sets of three ejection holes 33, symmetrically defined through the turntable 30 along a diameter of the turntable 30, and positioned adjacent to a periphery of the turntable 30. Each set of ejection holes 33 includes three ejection holes 33 separately defined through the turntable 30, corresponding to the three guiding holes 13 of the worktable 10.

Figure 2:
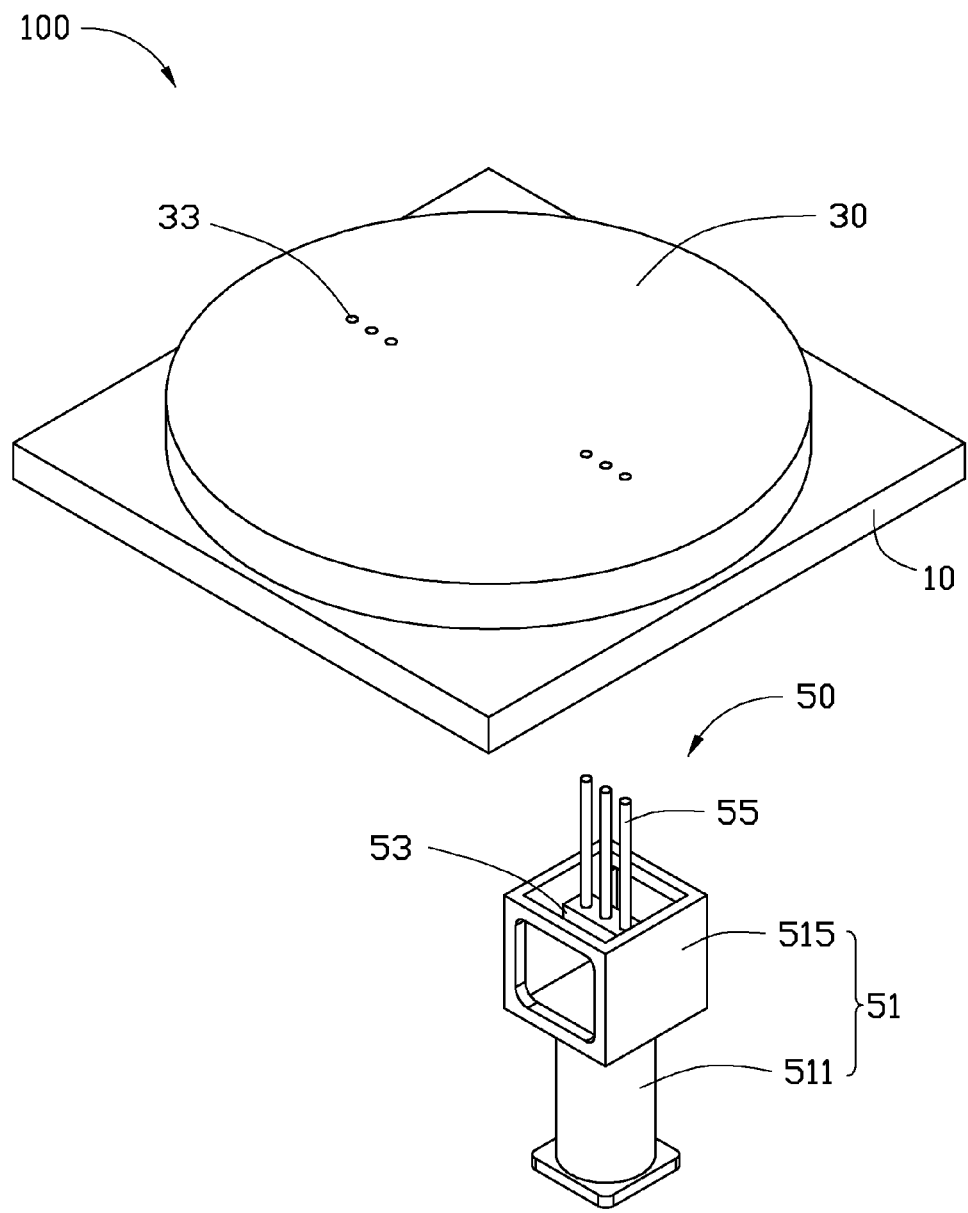
FIG. 2 is an exploded, isometric view of the turntable device of FIG. 1.
Figure 3:
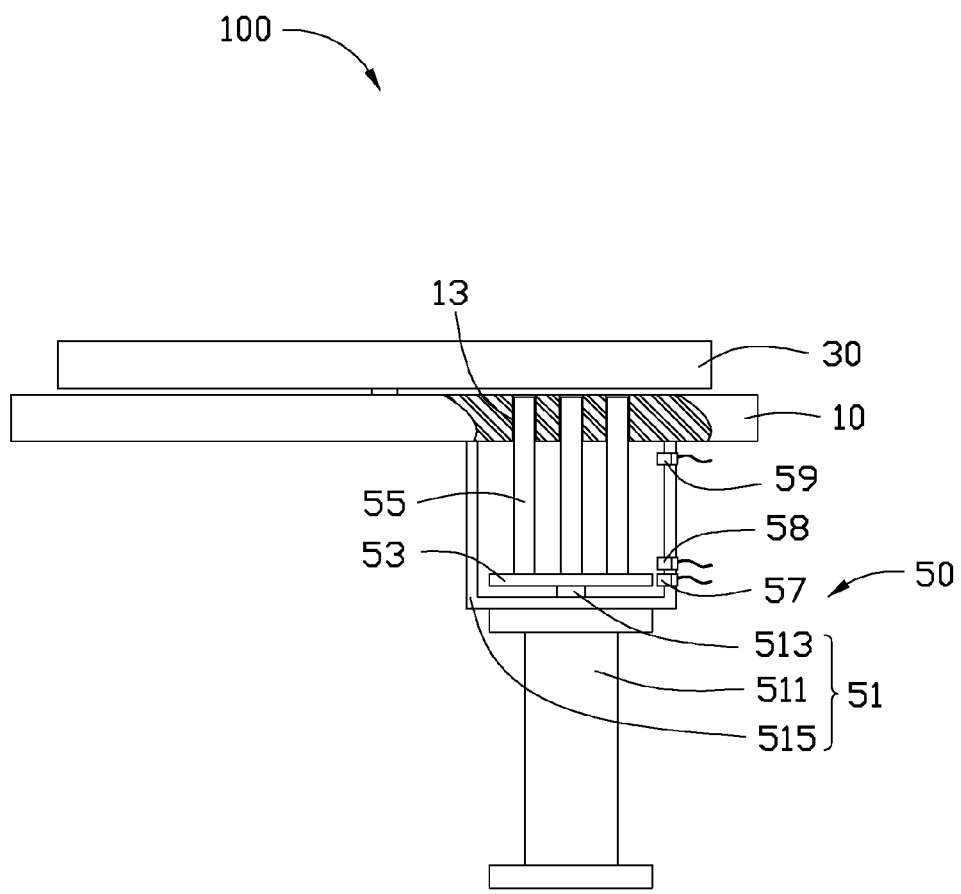
FIGS. 3 through 6 are four schematic views of the turntable device working under four different working states.

Also referring to FIGS. 2 and 3, the positioning control ejection mechanism 50 is vertically assembled under the worktable 10 to position control the turntable 30, and capable of ejecting a formed product (not shown) within a mold (not shown) mounted upon the turntable 30. The positioning control ejection mechanism 50 includes an ejection motor 51, an ejection board 53 driven by the ejection motor 50, at least one ejection rod 55 fixed to the ejection board 53, a lower limit switch 57, a position confirm switch 58, and an upper limit switch 59. In one embodiment, there are three ejection rods 55 and the ejection motor 51 is an ejection cylinder or an ejection hydraulic cylinder including a cylinder body 511, a piston push rod 513, and a hollow protection cap 515. The piston push rod 513 is slidably assembled within the cylinder body 511 and is exposed from one end of the cylinder body 511. The protection cap 515 is mounted to the end of the cylinder body 511 to protect the piston push rod 513 as the piston push rod 513 runs out of the cylinder body 511.

The ejection board 53 is fixed to a distal end of the piston push rod 513, and is driven by the ejection motor 51, such that the ejection board 53 together with the three ejection rods 55 are slidably and telescopically received within the protection cap 515.

Also referring to FIG. 3, the three ejection rods 55 are separately fixed to the ejection board 53 and are substantially perpendicular to the ejection board 53. The distal end of each ejection rod 55 is received within the corresponding one guiding hole 13 of the worktable 10. For ejecting the formed product, the three ejection rods 55 are slidably driven by the ejection motor 51 together with the ejection board 53.

The lower limit switch 57 is assembled to an inner wall of the protection cap 515 and positioned adjacent to an end of the cylinder body 511. The lower limit switch 57 is configured for triggering the ejection motor 51 to operate, thereby driving the piston push rod 513 together with the ejection board 53 and the ejection rods 55 to slide toward the worktable 10 and the turntable 30. The lower limit switch 57 can also configured for transmitting a stop signal to the ejection motor 51 to turn off the ejection motor 51 as the piston push rod 513 returns back to its original position, to prevent the piston push rod 513 from striking against the cylinder body 511. In one embodiment, the lower limit switch 57 is assembled at a same level as the original position of the piston push rod 513. In one embodiment, the lower limit switch 57 is a proximity sensing switch.

The position confirm switch 58 is also assembled to the inner wall of the protection cap 515 and is positioned slightly higher than the lower limit switch 57 along a direction toward the worktable 10 and the turntable 30, namely, an ejection direction of the piston push rod 513. A distance between the position confirm switch 58 and the lower limit switch 57 is substantially the same as the distance between the worktable 10 and the turntable 30. The position confirm switch 58 is configured for sensing whether the ejection rod 55 is aligned with the corresponding ejection hole 33 of the turntable 30. Thus, when the ejection rod 55 is driven to slide toward the turntable 30 and aligns with the corresponding ejection hole 33, the position confirm switch 58 transmits a signal to stop the turntable 30 from rotating, and a position confirm signal to the ejection motor 51 simultaneously. When the ejection motor 51 receives the position confirm signal transmitted by the position confirm switch 58, the ejection motor 51 continues to drive the ejection rod 55 to slide upward until the formed product positioned upon the ejection hole 33 of the turntable 30 is ejected. Otherwise, the ejection rod 55 would be driven by the ejection motor 51 to continuously and intermittently contact the bottom surface of the turntable 30, until the ejection rod 55 aligns and passes through the ejection hole 33 of the turntable 30. In one embodiment, the position confirm switch 58 is also a proximity sensing switch.

The upper limit switch 59 is assembled to the inner wall of the protection cap 515 and is positioned away from the ejection motor 51 and adjacent to the worktable 10. The upper limit switch 59 is for sensing whether the ejection rod 55 is ejected out completely, and prevents the ejection rod 55 from being over ejected, thereby avoiding breakage of the cylinder body 511 or the worktable 10 accidentally. In one embodiment, the upper limit switch 59 is assembled at a height substantially the same as the ejection board 53, as the ejection board 53 is being completely ejected.

Figure 4:
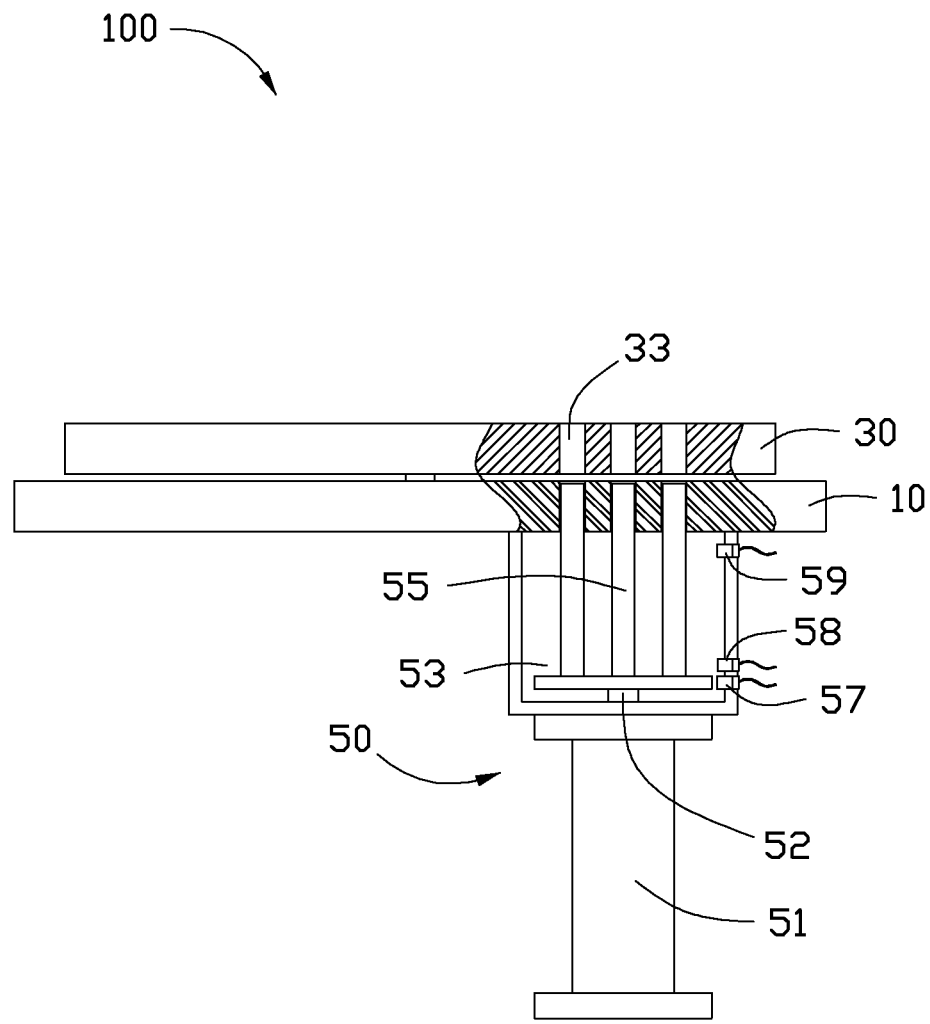
Figure 5:
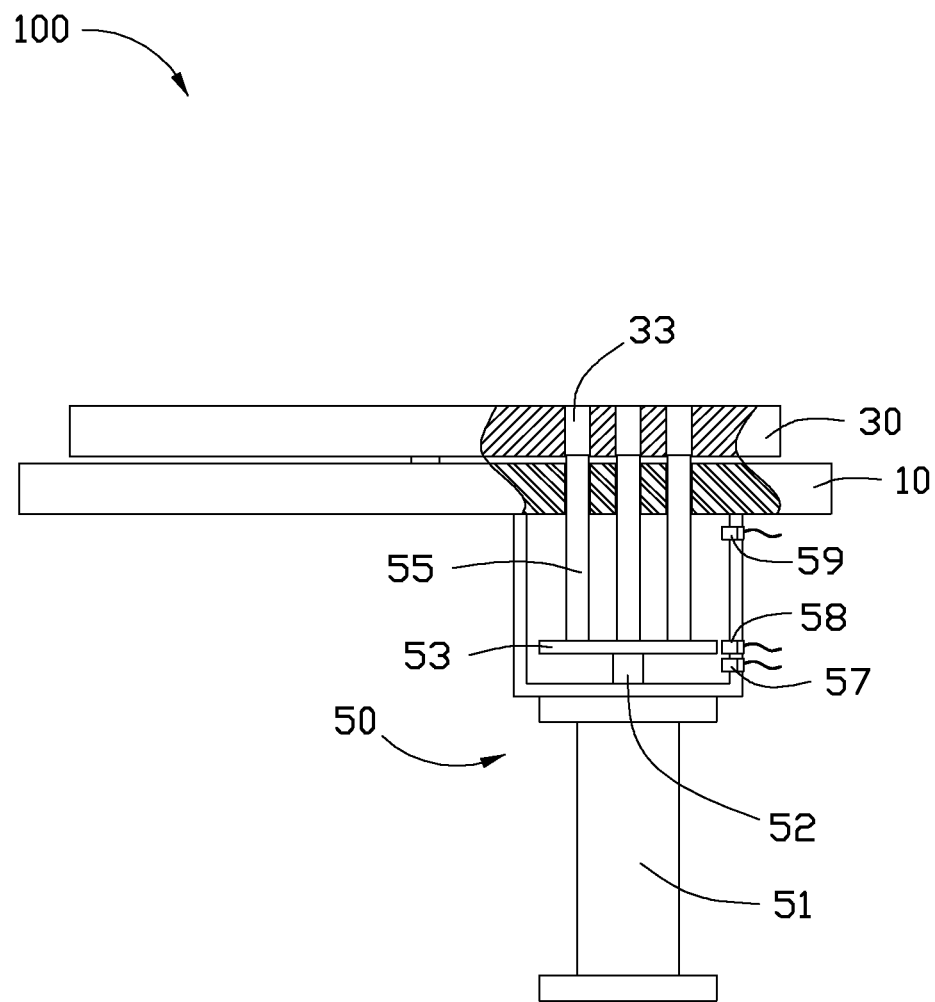
Figure 6:
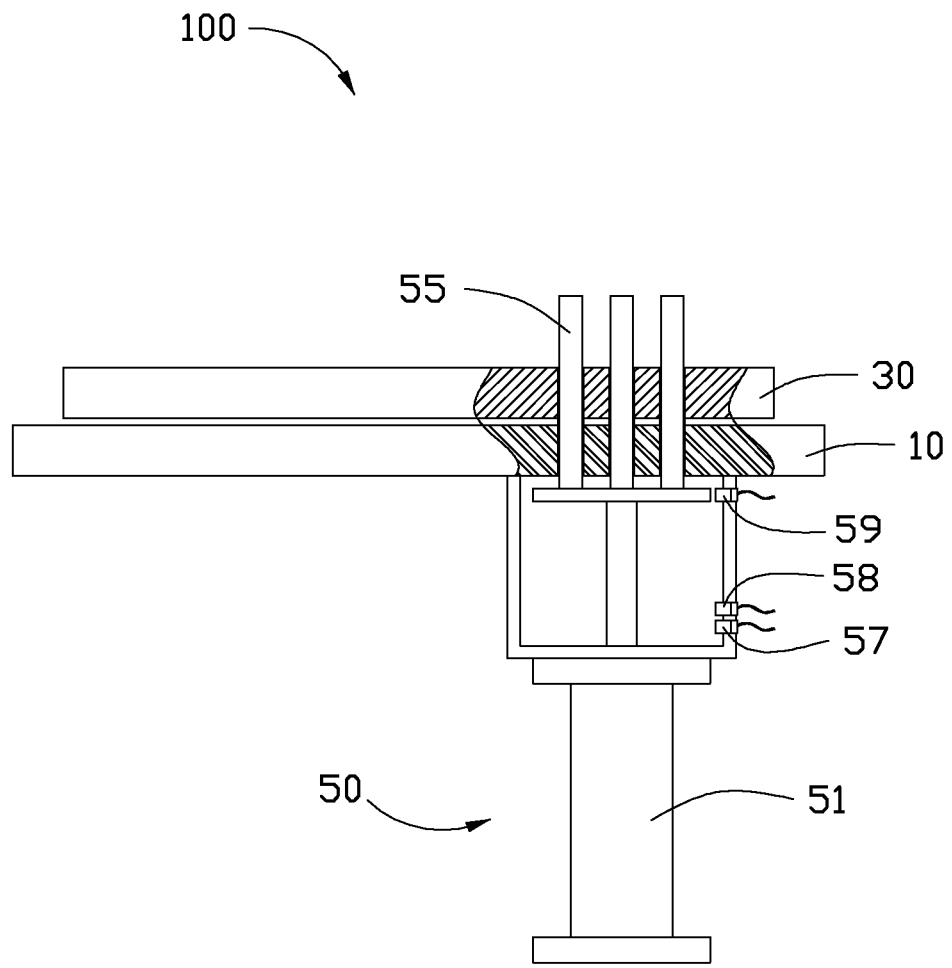

Also referring to FIGS. 4 through 6, during use, the turntable 30 is driven to rotate upon the worktable 10 by a driver (not shown). A forming mold (not shown) is mounted upon the turntable 30 for forming a product. After the product is formed within the forming mold and is cooled down, the lower limit switch 57, then triggers the ejection motor 51 to operate, causing the ejection board 53 together with the ejection rod 55 to slide upward toward the turntable 30. When the ejection hole 33 of the turntable 30 aligns with the corresponding guiding hole 13 of the worktable 10 and the ejection rod 55, the position confirm switch 58 transmits a signal to stop the turntable 30 from rotating, and further transmits a position confirm signal to the ejection motor 51 simultaneously. The ejection motor 51 then continues to drive the ejection rod 55 to slide upward and pass through the corresponding ejection hole 33 of the turntable 30 to eject the formed product positioned upon the ejection hole 33 of the turntable 30. When the ejection rod 55 is ejected out completely, the upper limit switch 59 will transmit a stop signal to stop the ejection motor 51 to prevent the ejection rod 55 from being over ejected. After the formed product is ejected out and removed, the ejection rod 55 together with the piston push rod 513 is driven to slide back to its original position.

It is to be understood that the ejection board 53 can also be omitted, such that the ejection rod 55 is directly mounted to the piston push rod 513 and directly driven by the ejection motor 51.

It is to be understood, however, that even through numerous characteristics and advantages of the disclosure have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A positioning control ejection mechanism, comprising:
an ejection motor;
at least one ejection rod slidably driven by the ejection motor;
a position confirm switch assembled to the ejection motor and positioned along an ejection direction of the at least one ejection rod, the position confirm switch sensing when the at least one ejection rod is aligned with a pre-ejection product;
an upper limit switch assembled to the ejection motor and positioned along an ejection direction of the at least one ejection rod, preventing the at least one ejection rod from being over ejected; and
a lower limit switch assembled to the ejection motor and positioned along an ejection direction of the at least one ejection rod for triggering the ejection motor to operate, and transmitting a stop signal to the ejection motor to turn off the ejection motor.

2. The positioning control ejection mechanism as claimed in claim 1, wherein the ejection motor is an ejection cylinder or an ejection hydraulic cylinder comprising a cylinder body and a piston push rod; the piston push rod is slidably assembled within the cylinder body and is exposed from one end of the cylinder body; the at least one ejection rod is mounted to the piston push rod, and the lower limit switch is positioned adjacent to the end of the cylinder body to transmit the stop signal to the ejection motor to turn off the ejection motor as the piston push rod returns back to its original position.

3. The positioning control ejection mechanism as claimed in claim 2, wherein the ejection motor further comprises a hollow protecting cap mounted to the end of the cylinder body, and the at least one ejection rod is slidably received within the protecting cap.

4. The positioning control ejection mechanism as claimed in claim 3, wherein the positioning control ejection mechanism further comprises an ejection board fixed to a distal end of the piston push rod and is slidably and telescopically received within the protecting cap; the at least one ejection rod is fixed to the ejection board and is substantially perpendicular to the ejection board.

5. The positioning control ejection mechanism as claimed in claim 4, wherein the lower limit switch is assembled to an inner wall of the protecting cap.

6. The positioning control ejection mechanism as claimed in claim 2, wherein the lower limit switch is assembled at a same level as the original position of the piston push rod.

7. The positioning control ejection mechanism as claimed in claim 1, wherein the lower limit switch is a proximity sensing switch.

8. The positioning control ejection mechanism as claimed in claim 5, wherein the position confirm switch and the upper limit switch are both separately assembled to the inner wall of the protecting cap; the position confirm switch is positioned slightly higher than the lower limit switch along the ejection direction of the piston push rod, and is positioned between the upper limit switch and the lower limit switch.

9. A turntable device, comprising:
a worktable defining at least one guiding hole;
a turntable rotatably mounted upon the worktable, the turntable defining at least one ejection hole corresponding to the at least one guiding hole of the worktable; and
a positioning control ejection mechanism vertically assembled under the worktable to position controlling the turntable and eject a pre-ejection formed product positioned upon the turntable, the positioning control ejection mechanism comprising:
an ejection motor;
at least one ejection rod slidably driven by the ejection motor;
a position confirm switch assembled to the ejection motor and positioned along an ejection direction of the ejection rod, the position confirm switch sensing when the at least one ejection rod is aligned with the pre-ejection formed product;
an upper limit switch assembled to the ejection motor and positioned along an ejection direction of the ejection rod, preventing the ejection rod from being over ejected; and
a lower limit switch assembled to the ejection motor and positioned along an ejection direction of the at least one ejection rod for triggering the ejection motor to operate, and transmitting a stop signal to the ejection motor to turn off the ejection motor.

10. The turntable device as claimed in claim 9, wherein three guiding holes are separately defined through the worktable, and two sets of three ejection holes are symmetrically defined through the turntable corresponding to the three guiding holes of the worktable.

11. The turntable device as claimed in claim 9, wherein the ejection motor is an ejection cylinder or an ejection hydraulic cylinder comprising a cylinder body and a piston push rod slidably assembled within the cylinder body and exposed from one end of the cylinder body; the ejection rod is mounted to the piston push rod, and the lower limit switch is positioned adjacent to the end of the cylinder body to transmit the stop signal to the ejection motor to turn off the ejection motor as the piston push rod returns back to its original position.

12. The turntable device as claimed in claim 11, wherein the ejection motor further comprises a hollow protecting cap mounted to the end of the cylinder body, and the ejection rod is slidably received within the protecting cap.

13. The turntable device as claimed in claim 12, further comprising an ejection board fixed to a distal end of the piston push rod and slidably and telescopically received within the protecting cap; the at least one ejection rod is fixed to the ejection board and is substantially perpendicular to the ejection board.

14. The turntable device as claimed in claim 13, wherein the lower limit switch is assembled to an inner wall of the protecting cap.

15. The turntable device as claimed in claim 9, wherein the lower limit switch is assembled at a same level as the original position of the piston push rod.

16. The turntable device as claimed in claim 14, wherein the position confirm switch and the upper limit switch are both separately assembled to the inner wall of the protecting cap; the position confirm switch is positioned slightly higher than the lower limit switch along the ejection direction of the piston push rod, and is positioned between the upper limit switch and the lower limit switch.

* * * * *